US010534775B2

(12) United States Patent
Moerkotte et al.

(10) Patent No.: US 10,534,775 B2
(45) Date of Patent: Jan. 14, 2020

(54) CARDINALITY ESTIMATION FOR DATABASE QUERY PLANNING

(71) Applicant: SAP SE, Walldorf (DE)

(72) Inventors: Guido Moerkotte, Schriesheim (DE); Alexander Boehm, Schwetzingen (DE); Norman May, Karlsruhe (DE)

(73) Assignee: SAP SE, Walldorf (DE)

( * ) Notice: Subject to any disclaimer, the term of this patent is extended or adjusted under 35 U.S.C. 154(b) by 282 days.

(21) Appl. No.: 15/603,319

(22) Filed: May 23, 2017

(65) Prior Publication Data

US 2018/0341678 A1    Nov. 29, 2018

(51) Int. Cl.
 *G06F 16/2453*    (2019.01)
(52) U.S. Cl.
 CPC .............................. *G06F 16/24545* (2019.01)
(58) Field of Classification Search
 CPC combination set(s) only.
 See application file for complete search history.

(56) References Cited

U.S. PATENT DOCUMENTS

| 9,189,520 | B2 | 11/2015 | May et al. | |
|---|---|---|---|---|
| 2008/0306903 | A1* | 12/2008 | Larson | G06F 16/2462 |
| 2010/0198806 | A1* | 8/2010 | Graefe | G06F 16/24542 |
| | | | | 707/713 |

OTHER PUBLICATIONS

Larson, Per-Ake, et al. "Cardinality estimation using sample views with quality assurance." Proceedings of the 2007 ACM SIGMOD international conference on Management of data. ACM, 2007.
Moerkotte, Guido, et al. "Exploiting ordered dictionaries to efficiently construct histograms with q-error guarantees in SAP HANA." Proceedings of the 2014 ACM SIGMOD international conference on Management of data. ACM, 2014.
Moerkotte, Guido, Thomas Neumann, and Gabriele Steidl. "Preventing bad plans by bounding the impact of cardinality estimation errors." Proceedings of the VLDB Endowment 2.1 (2009): 982-993.

\* cited by examiner

*Primary Examiner* — Shuye Jiunn Hwa
(74) *Attorney, Agent, or Firm* — Mintz Levin Cohn Ferris Glovsky and Popeo, P.C.

(57) ABSTRACT

A system for cardinality estimation for database query planning is provided. In some implementations, the system performs operations comprising selecting a subset of data from a set of data on which a database query is to be executed, the set of data including a first quantity of tuples and the subset of data including a second quantity of tuples. The operations can further comprise determining, based on evaluating one or more predicates on the subset, a third quantity of tuples in the subset which satisfy the one or more predicates. The operations can further comprise determining, based on the first quantity, the second quantity, and the third quantity, a range within the subset that comprises estimated cardinalities of the one or more predicates within a predetermined error threshold range. Related systems, methods, and articles of manufacture are also described.

19 Claims, 4 Drawing Sheets

CARDINALITY ESTIMATION FOR DATABASE QUERY PLANNING

TECHNICAL FIELD

The subject matter described herein relates to query planning for the execution of database queries, and more particularly, cardinality estimation for database query planning.

BACKGROUND

In order to efficiently execute database queries, query plans can be generated, which define the manner in which the query is executed. Efficient query planning can potentially reduce unnecessary processing time and/or the unnecessary use of processing resources. For example, in situations where the execution of an operator within a query generates a large "intermediate result" (e.g., not the final result of the entire query), and a subsequent operator within the query eliminates a large portion of this intermediate result, then the eliminated portion (or at least a subset thereof) may be regarded as unnecessary for the execution of the query. The generation and processing of the unnecessary intermediate results can require additional computation time and/or result in unnecessary slowdown of the execution of queries. Accordingly, it can be desirable to provide systems and methods for more efficient query plan generation for the execution of database queries.

SUMMARY

In some aspects, a method, computer program product and system are provided. In an implementation, a system capable of making cardinality estimations is provided. The system can include (or otherwise utilize) at least one processor and/or memory, which can be configured to perform operations including selecting a subset of data from a set of data on which a database query is to be executed, the set of data including a first quantity of tuples and the subset of data including a second quantity of tuples. The operations can further include determining, based on evaluating one or more predicates on the subset, a third quantity of tuples in the subset which satisfy the one or more predicates. The operations can further include determining, based on the first quantity, the second quantity, and the third quantity, a range within the subset that comprises estimated cardinalities of the one or more predicates within a predetermined error threshold range.

In some variations, the operations can further include calculating one or more cardinality estimates for the one or more predicates within the range, and/or generating a query plan for execution of the database query based on the one or more cardinality estimates. In some aspects, the operations can further include generating, based on the database query, one or more algebra representation comprising the set of data, wherein the database query comprises the one or more predicates. In some variations, the subset can be selected randomly from the set of data.

In some implementations, determining the range can comprise calculating, based on the first quantity, the second quantity, and the third quantity, an estimate of a minimum quantity of tuples in the set of data which satisfy the one or more predicates, wherein the minimum quantity of tuples is a representative sample of the set of data. Additionally or alternatively, determining the range can comprise calculating, based on the first quantity, the second quantity, and the third quantity, an estimate of a maximum quantity of tuples in the set which satisfy the one or more predicates, wherein the maximum quantity of tuples is the representative sample of the set of data.

In related aspects, calculating the estimate of the minimum quantity can comprise calculating a probability based on $$\frac{\binom{n-l}{m-k}\binom{l}{m}}{\binom{n}{m}},$$

wherein n represents the first quantity, wherein m represents the second quantity, wherein k represents the third quantity, and wherein l represents a variable. Calculating the estimate of the minimum quantity can additionally or alternatively comprise setting the minimum value to equal the variable when the probability is greater than or equal to a probability threshold. In some implementations, the estimate of the minimum quantity and/or the estimate of the maximum quantity can be calculated based on a fixed-point calculation.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

As noted above, the generation and processing of intermediate results can require additional computation time and result in unnecessary slowdown of the execution of queries. As such, systems and methods are provided for processing calculation scenarios such that the size of intermediate results is minimized and/or processing time is decreased.

Figure 1:
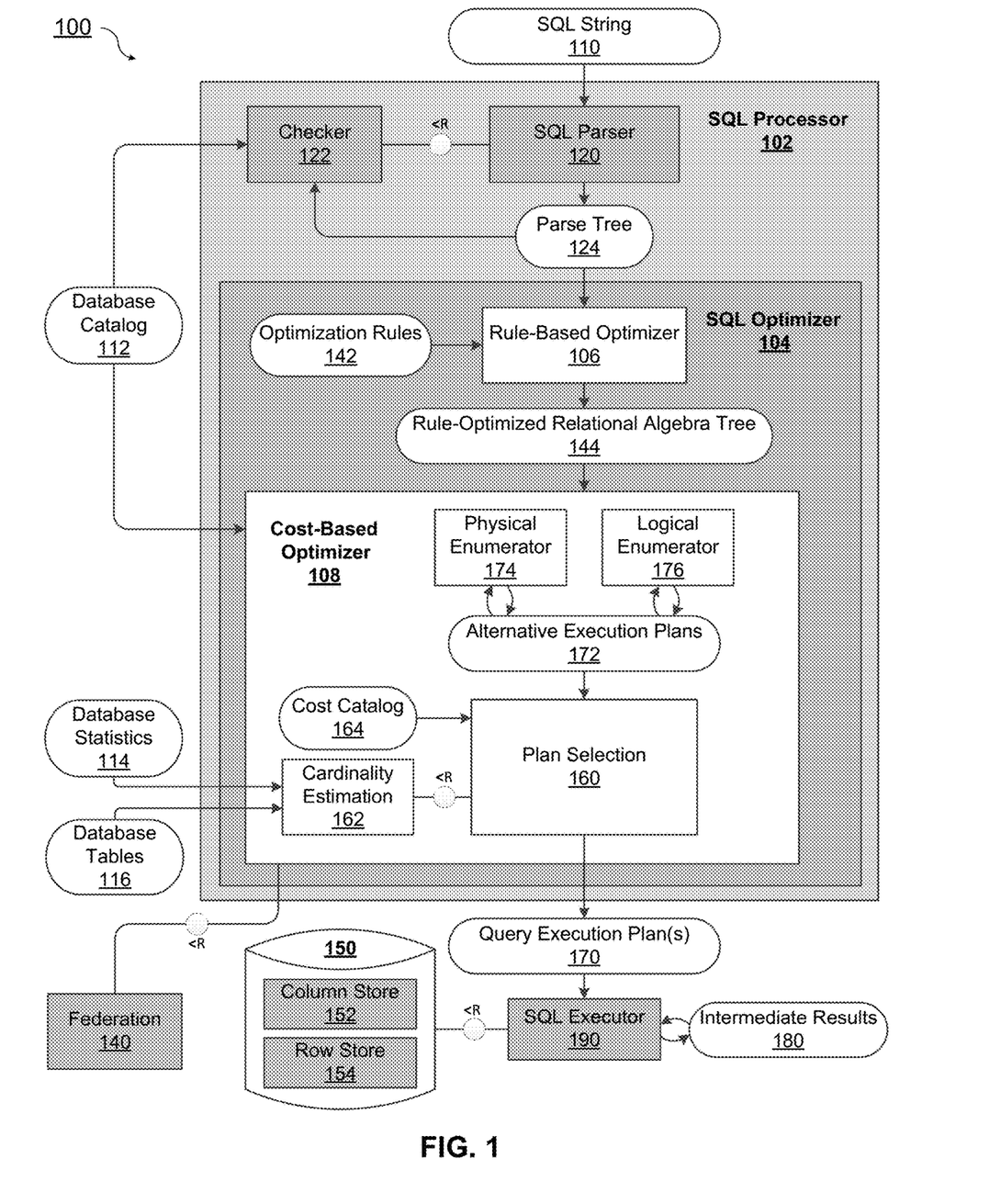
FIG. 1 depicts a functional block diagram of a system for database query processing and execution, in accordance with some example implementations.

FIG. 1 depicts a functional block diagram of a system 100 for database query processing and execution, in accordance with some example implementations. As shown, the system 100 can include a SQL processor 102, a database 150, a SQL executor 190, and/or a federation module 140. In some aspects, the SQL processor 102 can be used to implement a SQL parser 120, a checker 122, and/or a SQL optimizer 104. The SQL optimizer 104 can be used to process/handle a SQL string 110 (e.g., at least a portion of a database query) to generate one or more query execution plans 170 for execution by the SQL executor 190. In order to generate the one or more query execution plans 170, the SQL processor 102 may access and/or receive information from a database catalog 112, database statistics 114, database tables 116, and/or the like. In some aspects, one or more of the database catalog 112, database statistics 114, and database tables 116 may reside in the database 150.

In some implementations, the SQL parser 120 can check the syntactical structure of the SQL query 110 and/or generate a parse tree 124. The checker 122 can analyze the semantics of the parse tree 124 and/or determine whether issues exist, such as incompatible operations types nonexistent tables referenced therein. In some aspects, the checker 122 can utilize a database catalog 112 for these purposes. If valid, for example, the parse tree 124 can be provided to the SQL optimizer 104, which can include a rule-based optimizer 106 and/or a cost-based optimizer 108. The rule-based optimizer 106 can apply optimizations to the parse tree 124 based on the structure of the query and/or optimization rules 142 (e.g., without considering statistics or costs). A rule-optimized relational algebra tree 144 can, in turn, be provided to the cost-based optimizer 108.

The cost-based optimizer 108 can include a plan selection module 160, a cardinality estimation module 162, a physical enumerator 174, and/or logical enumerator 172. The physical enumerator 174 and/or logical enumerator 172 can generate a plurality of alternative query execution plans 172, such as by varying the physical layout and or logic of the relational algebra tree 144.

To be able to calculate costs for the alternative execution plans 172, the plan selection 160 can rely on a cost catalog 164 for cost functions. The cost functions can use cardinality estimations 162 as input. Similarly, cardinality estimation 162 can be utilized during enumeration of the alternative execution plans 172. Cardinality estimation 162 can rely on various methods and/or various data structures. For example, sampling and or histograms can be leveraged for cardinality estimation. Additionally or alternatively, the systems and methods of cardinality estimation described herein can be used.

Database queries, for which execution plans 170, 172 are generated, can request information (e.g., in the form of a result) based on one or more underlying data tables 116 (or some other structure), which may be stored within a database 150. Database queries can be defined to include a plurality of predicates, which can be defined as condition(s) under which a given portion of a data table (e.g., an entry or a tuple) satisfies a portion of the query. Such predicates can be determined and/or evaluated based on one or more views.

Plan selection 160 can pick the plan with the smallest cost generated during plan enumeration. As these costs are based on cardinality estimation 162, better cardinality estimates can provide for better plan selection 160. The chosen query execution plan 170 is passed on for execution by the SQL executor 190. In some aspects, the selected query execution plan 170 can be cached for later use (e.g., and bypass query optimization). For example, a query may ask for all rows from Table A where variable X (e.g., a value of a certain column) is greater than five and where variable Z is less than one hundred. Each of X>5 and Z<100 can be viewed as predicates of the query. If thousands of rows in Table A satisfy the predicate X>5, but only one row in Table A satisfies the predicate Z<100, then executing the X>5 predicate first can result in operating inefficiencies. For example, if the thousands of rows which satisfy the predicate X>5 are retrieved from a database 150 and/or used by a SQL executor 190 to generate intermediate results 180 for responding to this portion of the query, and then all or almost all of these intermediate results 180 are filtered out by the SQL executor 190 in the execution of the second predicate, then an unnecessary amount of intermediate results 180 may be generated by executing the X>5 predicate first.

Thus, it can be advantageous for the selector to pick the order of operations of query predicates and/or operations within the alternative execution plans 172, in order to minimize the size of intermediate results 180 and/or processing resources/time required by the SQL executor 190 for the execution of a query. Such selections can be made on the basis of cardinality estimates 162, which can be indications of the expected size of intermediate results 180 of a given query operation/predicate. As part of query plan generation, the database optimizer 104 can order query operations (e.g., predicate or combination of predicates) which are expected to generate the smallest intermediate results 180 for earlier execution than query operations which are expected to generate larger intermediate results 180. Such ordering can be performed on the basis of cardinality estimates, which can be regarded as a number of estimated tuples which are expected to be provided as a result of the execution of the operation. Accordingly, it can be desirable to provide systems and methods for accurate cardinality estimation for database query planning. As used herein, the term "tuple(s)" is intended to refer to n-tuples, wherein n can represent any non-negative integer (or some other range of values).

In some aspects, the SQL executor 190 can perform parallel execution, such that multiple procedures can be executed in parallel (e.g., until the next synchronization point). The results of query execution can be provided for storage within memory, such as the database 152, which can comprise a column store 152 and/or a row store. Although several aspects illustrated and described herein relate to SQL, additional and/or alternative domain-specific languages can be utilized.

In order to determine whether a cardinality estimate is accurate, a value know as a "q-error" can be calculated. In some implementations, the q-error of a cardinality estimate can be represented by:

$$qerr(c,\hat{c}):=\max(c/\hat{c},\hat{c}/c)$$

wherein c represents the cardinality of an operation and $\hat{c}$ represents a cardinality estimate of c.

If there are multiple cardinalities and/or cardinality estimates for a given operation, the q-error of the cardinality estimate(s) can be represented by:

$$maxqerr(c_i, \hat{c}_i) = \max_i \max(c_i/\hat{c}_i, \hat{c}_i/c_i)$$

wherein $c_i$ represents the cardinality of an operation and $\hat{c}_i$ represents a cardinality estimate of $c_i$.

A disadvantage of the above calculations can be that a very large q-error can be generated if a cardinality estimate is calculated to be a relatively small decimal, even though the cardinality estimate may not be off by much, in terms of absolute values. For example, if "c=10" and "ĉ=1", then the q-error may be "10", but the absolute value error may be regarded as small and/or might not matter. Thus, in order to compensate for this issue, the q-error of a cardinality estimate can be represented by:

$$qerr_\theta(c, \hat{c}) = \begin{cases} qerr(c, \hat{c}), & \text{if } c > \theta \text{ or } \hat{c} > \theta \\ 1, & \text{else} \end{cases}$$

wherein θ operates as a threshold to ignore small values (e.g., quantify scenarios where an error does not matter).

Similarly, if there are multiple cardinalities and/or cardinality estimates for a given operation, the q-error of the cardinality estimate(s) can be represented by:

$$maxqerr_\theta(c_i, \hat{c}_i) := \max_i qerr_\theta(c_i, \hat{c}_i)$$

wherein θ operates as a threshold to ignore small values.

However, in many circumstances, these methods of estimating q-error may not be accurate, especially when a given sample utilized to estimate the cardinality of a given predicate contains a small number of tuples (or no tuples) which satisfy the predicate. For example, an estimator of the selectivity of a sample, referred to herein a naïve estimator $Est_N$, can be defined as:

$$Est_N := \begin{cases} \frac{|Sp|}{|S|}, & \text{if } |Sp| \neq 0 \\ \frac{1}{|S|}, & \text{if } |Sp| = 0 \end{cases}$$

wherein S represents the sample set, |S| (hereinafter "m") represents the number of samples (e.g., tuples) in S, and $|S_p|$ represents the number of samples in S which satisfy a given predicate p. In some aspects, such an estimator may use fixed sample sizes (e.g., 1000, 2000, 4000, or 8000 samples). However, such an estimator simply focuses on the sample S itself, and does not take into account the entire relation/set from which S is taken.

In some aspects, the sample S can be taken (e.g., randomly) from relation R, which represents a relation or view content that includes |R| (hereinafter "n") tuples. Predicate p represents a predicate used on R to generate $R_p$ (the set of tuples matching predicate p) and on S to generate $S_p$. The number of tuples in $R_p$ is represented by $|R_p|$ (hereinafter "l"), and the number of samples in $S_p$ is represented by $|S_p|$ (hereinafter "k").

Instead of $Est_N$, a new estimator $Est_S$ can be utilized, wherein $Est_S$ returns:

$$\mu(n,m,k):=\sqrt{\alpha(n,m,k)*\omega(n,m,k)}$$

wherein α(n, m, k) is defined as the minimum value of l and ω(n, m, k) is defined as the maximum of l (e.g., the high and low end of a range) that are required to guarantee (within a margin of error) that a given k holds, taking m and n into account.

For example, given some value of k, the probability that $k=|S_p|$ holds can be defined as:

$$P(n, m, k, l) := \frac{\binom{n-l}{m-k}\binom{l}{m}}{\binom{n}{m}}$$

wherein $$\binom{x}{y}$$

represents the binomial coefficient of x and y $$\left(\text{e.g., } \frac{x!}{y!(x-y)!}\right).$$

This probability P can be compared against a reference/threshold probability ε to determine α and ω. Such procedures can fix the size of the result of a sample and not the sample size itself, as in other systems. Doing so can provide a better result size estimates for plan selection 160.

For example α and ω can be defined as:

$$\alpha(n,m,k):=\min\{l|P(n,m,k,l)\geq\varepsilon\}$$

$$\omega(n,m,k):=\max\{l|P(n,n,k,l)\geq\varepsilon\}$$

wherein min/max{l|x} can be expressed as the minimum/maximum value of l so that x is true. In various implementations, ε can be set to different values to change the sensitivity of the estimation and/or confidence in the results of α and ω, as well as any evaluations which utilize α and/or ω. For example, ε can be set to $10^{-5}$ to provide a 99.999% confidence (1−ε) in the results of α and/or ω. Other values of ε are possible.

In some aspects, μ(n, m, k) can be regarded as the geometric mean/q-middle of α and ω. In related aspects, ρ can be regarded as the q-error of μ and/or can be defined as:

$$\rho(n, m, k) := \sqrt{\frac{\omega(n, m, k)}{\alpha(n, m, k)}}$$

In related aspects, ζ(n, m) can be defined to provide the minimum number of qualifying sample tuples k required, such that a q-error q is at or below some threshold, with the probability of ε (upon which α and ω are defined). For example, ζ scan be defined as:

$$\zeta(n,m) := \min\{k | \rho(n,m,k) \leq q\}$$

wherein min{k|x} can be expressed as the minimum value of k so that x is true.

In some implementations, q can be set to a threshold q-error value which is considered acceptable, which can vary from the evaluation of one predicate to another. In some implementations, q=2.0 can be utilized. However, other values of q are possible such that a more stringent or a more lax q-error can be searched for. Additionally or alternatively, the underlying data set R can dictate what value(s) of q are acceptable.

Figure 2:
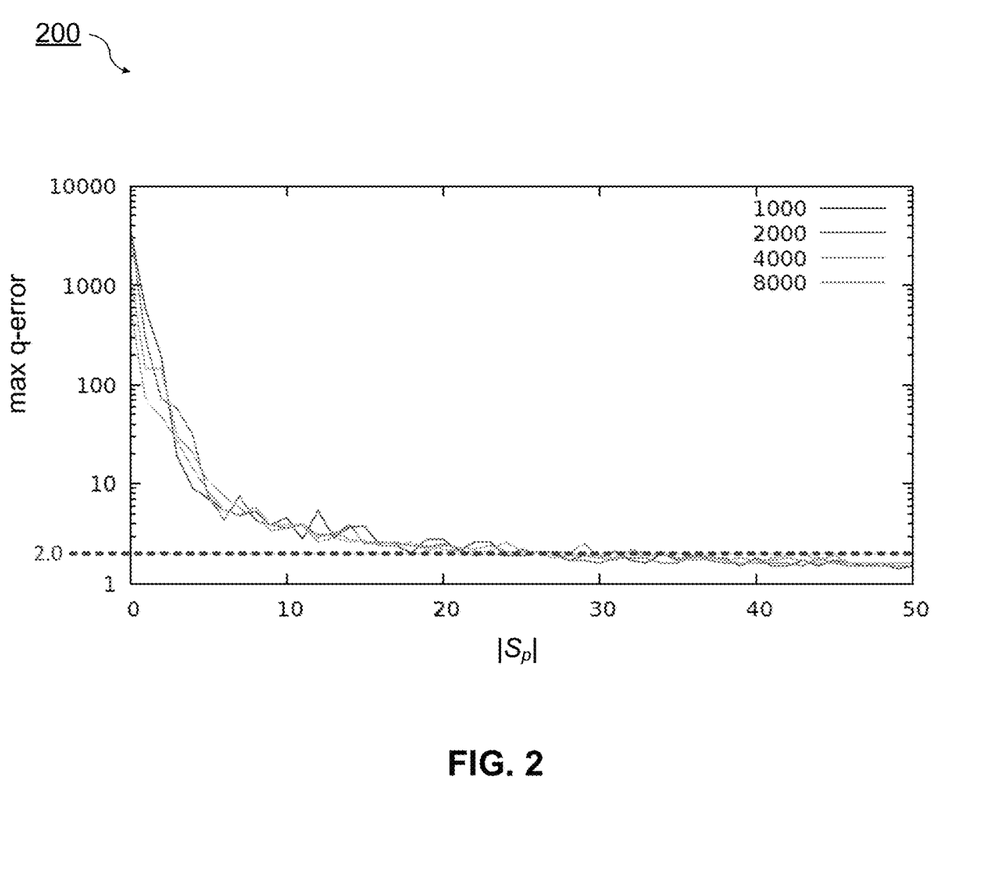
FIG. 2 depicts a graph of estimated error rates, in accordance with some example implementations.

For example, FIG. 2 depicts a graph 200 of estimated error rates, in accordance with some example implementations. The y-axis of the graph 200 illustrates a maximum q-error value in a given sample S, and the y-axis of the graph 200 illustrates the number of samples k (illustrated as ISA) which satisfy predicate p. As illustrated, increasing the sample size m (e.g., 1000, 2000, 4000, and 8000 samples) alone does not automatically yield low q-errors when k is lower. For example, even if 8000 samples are taken, when only a few tuples satisfy a predicate, the maximum q-error of these samples can be between ten and one hundred (meaning that cardinality estimates based on these samples are ten to one hundred times less accurate). However, as k increases, the maximum q-error also decreases, and at some point between k=30 and k=40, the maximum q-error of any given sample size m is below 2.0. Accordingly, it can be beneficial to identify an upper bound and a lower bound of a range where the maximum q-error is sufficiently low, such that more accurate cardinality estimates can be provided. In various implementations, this range can be identified based on α and/or ω.

Additionally or alternatively to estimator $Est_S$, an estimator $Est_T$ can be utilized, which is based on a threshold θ. In some implementations, $Est_T$ can return:

$$\max(\theta, \mu(n,m,k))$$

In some aspects, θ can be set to 1000 or some other value. Based on test data, $Est_S$ and/or $Est_T$ can provide more accurate q-error estimations. For example, Table 1 illustrates sample data comparisons of q-errors using estimators $Est_N$, $Est_S$, and $Est_T$. Other results can be achieved, as Table 1 is only an illustrative example.

TABLE 1

| k | Est N | theta | Est S | theta | Est T | theta |
|---|---|---|---|---|---|---|
|   | — | 1000 | — | 1000 | — | 1000 |
| 0 | 3687.0 | 3687.0 | 81.5 | 45.2 | 1000.0 | 3.7 |
| 1 | 581.0 | 9.5 | 90.4 | 61.1 | 1000.0 | 5.5 |

TABLE 1-continued

| k | Est N | theta | Est S | theta | Est T | theta |
|---|---|---|---|---|---|---|
|   | — | 1000 | — | 1000 | — | 1000 |
| 2 | 193.7 | 193.7 | 36.5 | 36.5 | 166.7 | 7.1 |
| 3 | 19.4 | 19.4 | 15.7 | 15.7 | 11.1 | 8.1 |
| 4 | 9.1 | 9.1 | 8.7 | 8.7 | 8.3 | 8.3 |
| 5 | 7.1 | 7.1 | 6.7 | 6.7 | 6.7 | 6.7 |
| 6 | 5.5 | 5.5 | 5.0 | 5.0 | 5.0 | 5.0 |
| 7 | 4.8 | 4.8 | 4.1 | 4.1 | 4.1 | 4.1 |
| 8 | 5.3 | 5.3 | 4.1 | 4.1 | 4.1 | 4.1 |
| 9 | 3.9 | 3.9 | 3.6 | 3.6 | 3.6 | 3.6 |
| 10 | 4.6 | 4.6 | 3.5 | 3.5 | 3.5 | 3.5 |
| 11 | 2.8 | 2.8 | 2.9 | 2.9 | 2.9 | 2.9 |
| 12 | 5.4 | 5.4 | 4.1 | 4.1 | 4.1 | 4.1 |
| 13 | 2.9 | 2.9 | 2.8 | 2.8 | 2.8 | 2.8 |
| 14 | 3.7 | 3.7 | 3.0 | 3.0 | 3.0 | 3.0 |
| 15 | 3.8 | 3.8 | 3.1 | 3.1 | 3.1 | 3.1 |
| 16 | 2.4 | 2.4 | 2.1 | 2.1 | 2.1 | 2.1 |
| 17 | 2.4 | 2.4 | 2.3 | 2.3 | 2.3 | 2.3 |
| 18 | 2.0 | 2.0 | 2.2 | 2.2 | 2.2 | 2.2 |
| 19 | 2.8 | 2.8 | 2.4 | 2.4 | 2.4 | 2.4 |
| 20 | 2.8 | 2.8 | 2.4 | 2.4 | 2.4 | 2.4 |
| 21 | 2.1 | 2.1 | 2.2 | 2.2 | 2.2 | 2.2 |
| 22 | 2.6 | 2.6 | 2.2 | 2.2 | 2.2 | 2.2 |
| 23 | 2.6 | 2.6 | 2.2 | 2.2 | 2.2 | 2.2 |
| 24 | 1.9 | 1.9 | 2.0 | 2.0 | 2.0 | 2.0 |
| 25 | 2.2 | 2.2 | 2.0 | 2.0 | 2.0 | 2.0 |
| 26 | 2.0 | 2.0 | 1.8 | 1.8 | 1.8 | 1.8 |
| 27 | 2.0 | 2.0 | 2.0 | 2.0 | 2.0 | 2.0 |
| 28 | 1.7 | 1.7 | 1.8 | 1.8 | 1.8 | 1.8 |
| 29 | 1.9 | 1.9 | 1.8 | 1.8 | 1.8 | 1.8 |
| 30 | 1.8 | 1.8 | 1.7 | 1.7 | 1.7 | 1.7 |

As can be seen in Table 1, even for lower values of k, $Est_S$ and/or $Est_T$ can provide more accurate cardinality estimates, as the q-errors are much lower. For example, where k=0 and θ=1000, $Est_N$ can provide a q-error of 3687.0, whereas $Est_T$ can provide a q-error of 3.7. Larger values for θ can provide smaller q-errors, as more measurements may be ignored in calculating the maximum q-error.

In some implementations, the calculations of α and/or ω can be sped up through the use of a fixed-point calculation (e.g., as opposed to utilizing a binary search). For example, in order to calculate l, all tuples in n must be evaluated based on predicate p. Additionally, the calculation of binomial coefficients can take additional processing resources, which becomes worse as each of n, m, k, and l increase. Accordingly, it can be beneficial to replace all binomials in P(n, m, k, l) with their definitions using factorials, then replacing all factorials by Stirling's approximation. Thereafter, the logarithm may be taken and the resulting terms may be sorted to two sides of the fixed-point calculation such that one side contains all the logarithmic terms and the other contains all the linear terms.

In some implementations, the fixed-point calculation can be implemented based on the procedure illustrated in Table 2.

TABLE 2

```
fixpoint(n, m, k, Lstart)
    eps = 1e-5;
    log_eps = log(eps);
    t0 = -fLogStirlingNoSqrtNoE(n);
    t2 = +fLogStirlingNoSqrtNoE(n-m);
    t4 = +fLogStirlingNoSqrtNoE(m);
    t5 = -fLogStirlingNoSqrtNoE(m-k);
    t7 = -fLogFactorial(k);
    log_d_1 = ((t0 + t2) + (t4 + t5)) + m - k;
    log_d_2 = t7;
```

TABLE 2-continued

```
lMaxDiff = (k < 10 ? 0.1 : 0.5);
l = Lstart;
do {
    l_old = l;
    log_n_1 = log( n - 1 );
    log_l = log( l );
    log_l_k = log( l - k );
    log_n_1_m_k = log( n - m + k - 1 );
    R1 = + ( 0.5 ) * log_l;
    R2 = + ( k - 0.5 ) * log_l_k;
    R4 = - ( n - m + k + 0.5 ) * log_n_1_m_k;
    R5 = + ( n + 0.5) * log_n_1;
    N3 = ( -log_n_1 + log_n_1_m_k + log_1 - log_l_k );
    R = ( ( ( R1 + log_d_2 ) + R2 ) + ( R4 + R5 ) );
    l = ( ( log_eps + ( ( m - log_d_1 ) ) - R) ) / N3;
} while( lMaxDiff < fabs( l_old - l) );
return l;
```

The procedure in Table 2 can be used to calculate α by using a lower bound for α as input. Similarly, in order to calculate ω, a lower bound for ω can be used as input. In some aspects, the inputs for α and ω should be different. In some aspects, fLogStirlingNoSqrtNoE(x) in the procedure of Table 1 can represent Stirling's approximation of x! (x factorial). In some implementations, the fixed-point procedure can be utilized to calculate α and/or ω in a microsecond, as opposed to a binary search, which can be approximately 1000 times slower (e.g., a millisecond). Although a specific procedure is provided, other procedures may be implemented, such as variations of this procedure.

Figure 3:
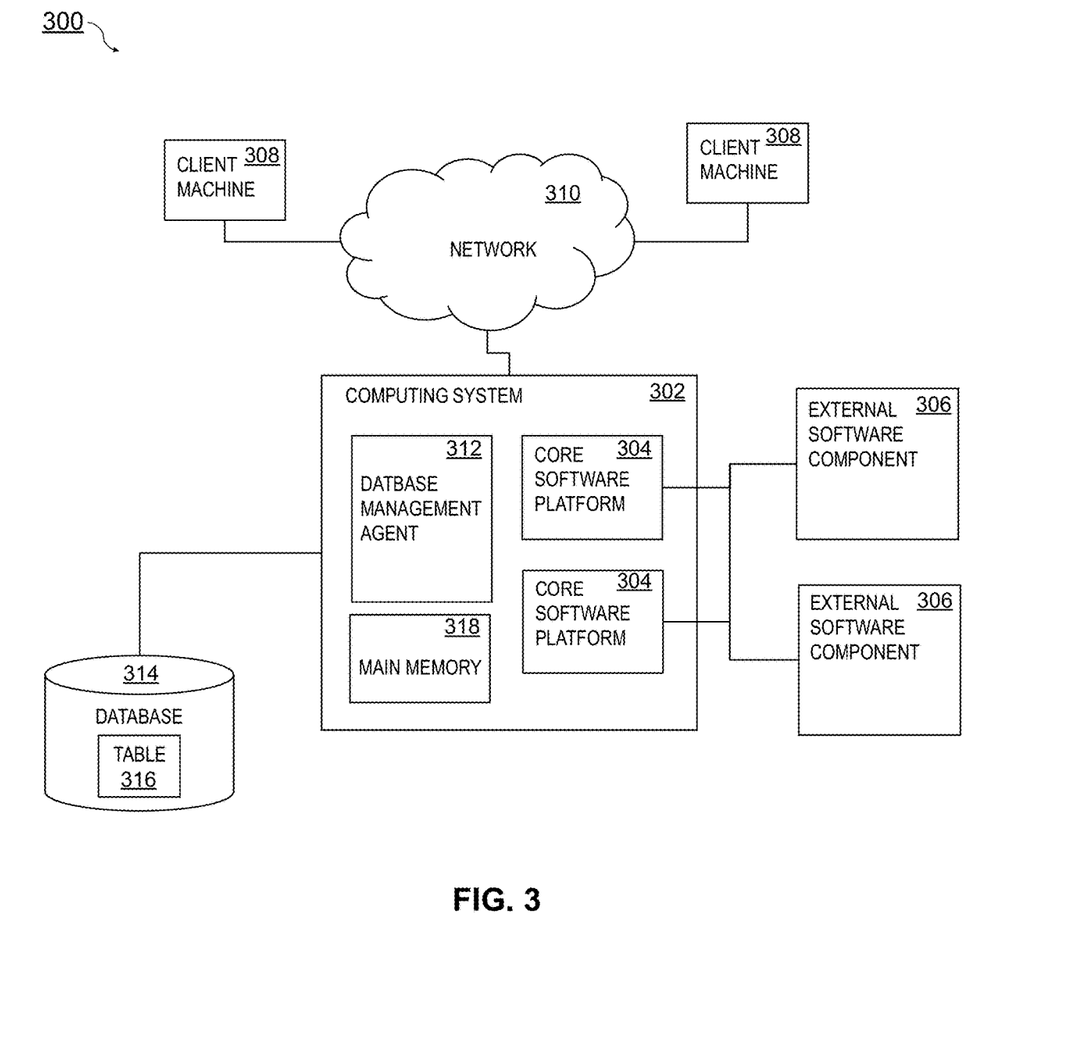
FIG. 3 depicts a database management system, in accordance with some example implementations.

FIG. 3 depicts a database management system 300, in accordance with some example implementations. As illustrated, the system 300 can include a computing system 302, one or more external software components 306, one or more client machines accessible over a network 310, and/or a database 314.

The computing system 302 may include one or more processors to execute instructions that may implement operations consistent with those described herein. Computing system 302 may include memory 318 to store executable instructions and/or information. Memory 318 may include solid-state memory, solid-state disk drives, magnetic disk drives, or any other information storage device. In some aspects, the memory 318 may provide storage for at least a portion of a database (e.g., the database 314 or some other organization of data).

The computing system 302 can include one or more core software platform modules 304 providing one or more features of a high-level programming software system or other software that includes database management features. The computing system can also aggregate or otherwise provide a gateway via which users can access functionality provided by one or more external software components 306. In some aspects, the computing system 302 can utilize one or more interfaces for communication. For example, the computing system 302 may include one or more user interface, which can include hardware or software interfaces, such as a keyboard, mouse, or other interface, some of which may include a touchscreen integrated with a display. In various implementations, user interfaces can include one or more peripheral devices and/or may be configured to communicate with these peripheral devices.

Communication among the devices in the system 300 can be through the use of direct communications, such as through the use of a wireless connection like Bluetooth, near-field communication (NFC), ZigBee, WiFi, some combination thereof, and/or the like. Additionally or alternatively, communication among the devices in the system 300 can be through the use of a hard wire connection such as universal serial bus (USB) and/or the like. Communication can additionally or alternatively occur through indirect communications, such as over a network 310, which can include a local area network, a wide area network, a wireless network, the Internet, some combination thereof, and/or the like.

Communication over the network 310 can utilize a network access device, such as a base station, a Node B, an evolved Node B (eNB), an access nodes (ANs), a hotspot, and/or the like. In some aspects, any of the client machines 308 can include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, and/or the like. Wired or wireless communication among the components of the system 300 can occur according to various protocols and/or access technologies (e.g., Global System for Mobile Communication (GSM), Universal Mobile Telecommunications System (UMTS), technologies developed by IEEE such as WiFi and/or Bluetooth, technologies developed by the Third Generation Partnership Project (3GPP) or 3GPP2 such as Long Term Evolution (LTE) and/or CDMA2000, etc.).

A database management agent 312 or other comparable functionality can access a database 314 that includes at least one table 316, which can in turn include at least one column and/or row. The database management agent 312 can be utilized to implement one or more of the features of implementations discussed herein. The database table 316 can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario, business process, and/or the like.

The database management agent 312 or other comparable functionality can be configured to load a database table 316, or other comparable data set, into the main memory 318. The database management agent 312 can be configured to load the information from the database 314 to the main memory 318 in response to receipt of a query instantiated by a user and/or computer system through one or more client machines 308, external software components 306, core software platforms 304, or the like. In some implementations, all, substantially all, or at least a large amount of the operational data of the database 314 can reside in-memory (e.g., in random-access memory (RAM)). Although the database 314 is illustrated as being separate and, at times, described as being separate from the computing system 302, in various implementations, at least a portion of the database 314 can be located within the computing system. The database 314 may be a column store database and/or the computing system 302 may be configured to perform OLTP (online transaction processing) and/or OLAP (online analytical processing), which can include complex analytics and tasks.

At least a portion of the illustrated system 300 may be implemented as a database management system (e.g., not including the client machines 308, the network 310, and/or the external software components 306). In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

Figure 4:
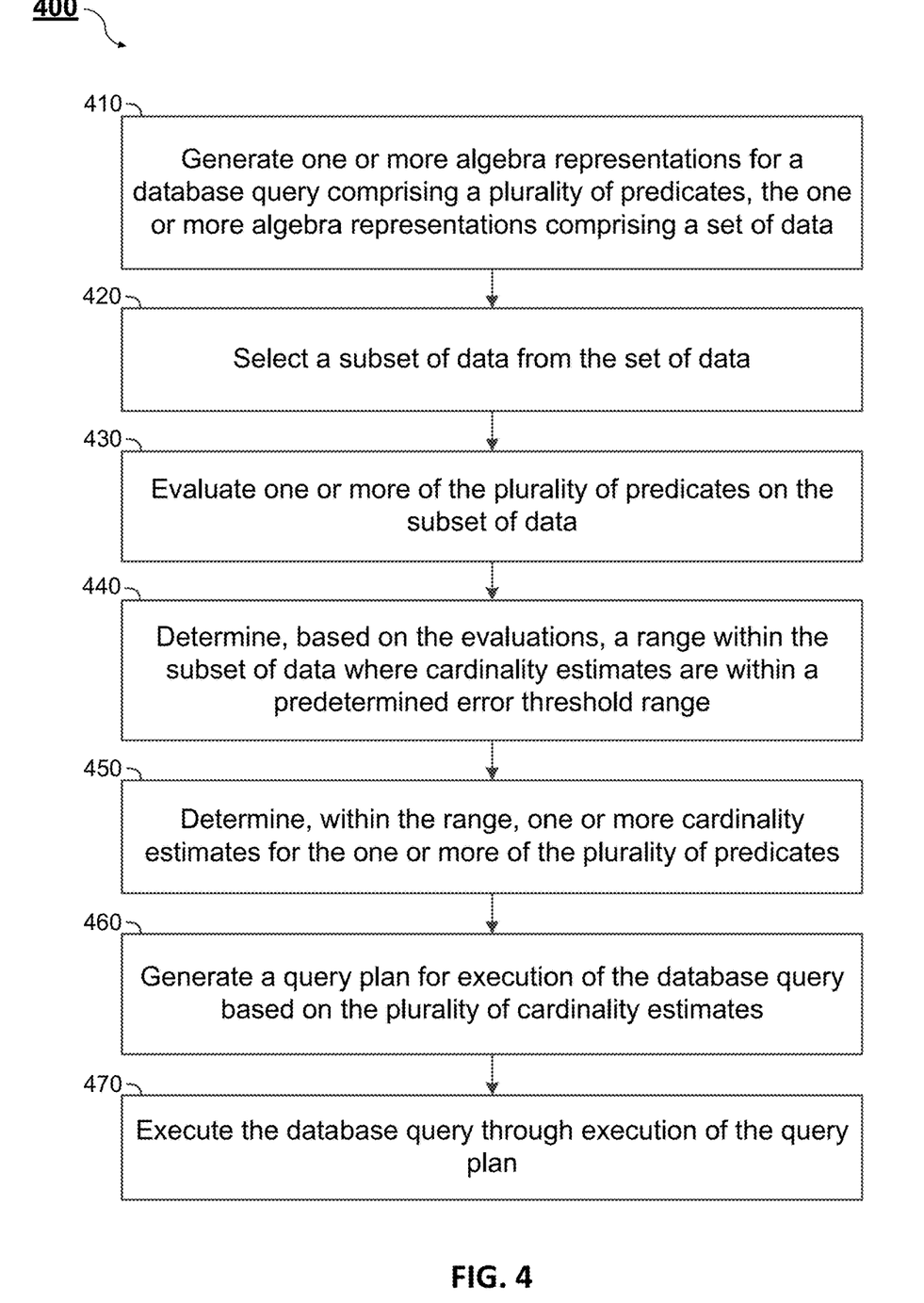
FIG. 4 depicts an example of a method for cardinality estimation for database query planning, in accordance with some example implementations.

FIG. 4 illustrates a flowchart of a method for cardinality estimation for database query planning, in accordance with some example implementations. In various implementations, the method 400 (or at least a portion thereof) may be performed by one or more of the SQL processor 102, the SQL optimizer 104, the cost-based optimizer 108, the SQL executor 190, the database 150, the system 300, the computing system 302, other systems/apparatuses, and/or some portion thereof.

Method 400 can start at operational block 410 where the SQL processor 102, for example, can generate one or more algebra representations for a database query comprising a plurality of predicates (e.g., operators), the one or more algebra representation comprising a set of data. In some aspects, the set of data can include one or more database tables, such as one or more database table identified in the database query (e.g., identified as an operand of one or more of the plurality of predicates). In some aspects, a view can include programming instructions (or the like) which make data stored in one or more database tables "visible"/accessible to a query optimizer, for example.

Method 400 can proceed to operational block 420 where the SQL processor 102, for example, can select a subset of data from the set of data. In some implementations, the subset can be selected randomly from the set of data. In some aspects, the set of data can include a first quantity of tuples and/or the subset of data can include a second quantity of tuples.

Method 400 can proceed to operational block 430 where the SQL processor 102, for example, can evaluate one or more of the plurality of predicates on the subset of data. In some aspects, the method 400 can additionally or alternatively include determining, based on evaluating the one or more of the plurality of predicates on the subset, a third quantity of tuples in the subset which satisfy the one or more predicates.

Method 400 can proceed to operational block 440 where the SQL processor 102, for example, can determine, based on the evaluations (e.g., based on the first quantity, the second quantity, and/or the third quantity), a range within the subset of data where cardinality estimates are within a predetermined error threshold range (e.g., q-error of the cardinality estimates is less than 2.0 or some other value). In some implementations, determining the range can include calculating (e.g., based on the first quantity, the second quantity, and/or the third quantity) an estimate of a minimum quantity of tuples in the set of data (e.g., a minimum quantity of tuples required) which satisfy the one or more predicates, wherein (e.g., such that) the minimum quantity of tuples is a representative sample of the set of data. Additionally or alternatively, determining the range can include calculating (e.g., based on the first quantity, the second quantity, and/or the third quantity) an estimate of a maximum quantity of tuples in the set of data (e.g., a maximum quantity of tuples required) which satisfy the one or more predicates, wherein (e.g., such that) the maximum quantity of tuples is a representative sample of the set of data.

In some aspects, calculating the estimate of the minimum quantity can comprise calculating a probability based on $$\frac{\binom{n-l}{m-k}\binom{l}{m}}{\binom{n}{m}},$$

wherein n represents the first quantity, wherein m represents the second quantity, wherein k represents the third quantity, and wherein l represents a variable. Additionally or alternatively, calculating the estimate of the minimum quantity can comprise setting the minimum value to equal the variable when the probability is greater than or equal to a probability threshold. In some aspects, the estimate of the minimum quantity can be calculated based on a fixed-point calculation. In various implementations, similar calculation(s) can be performed to calculate the estimate of the maximum quantity.

Method 400 can proceed to operational block 450 where the SQL processor 102, for example, can determine (e.g., calculate), within the range, one or more cardinality estimates for the one or more of the plurality of predicates. In some aspects, determining/calculating the one or more cardinality estimates can be in accordance with various cardinality estimate techniques, such as those discussed herein.

Method 400 can proceed to operational block 460 where the SQL processor 102, for example, can generate a query plan for execution of the database query based on the plurality of cardinality estimates. For example, the SQL processor 102 can select an order of operations for each (or at least a portion) of the plurality of operations, based on the plurality of cardinality estimates. In some aspects, when possible, operations which are estimated to have smaller cardinalities can be prioritized over (e.g., set to executed earlier than) operations which are estimated to have larger cardinalities.

Method 400 can proceed to operational block 470 where the SQL processor 102, for example, can execute the database query through execution of the query plan. In some aspects, executing the query plan can include executing the one or more of the plurality of predicates on at least a portion of the set of data, in an order specified by the query plan.

Performance of the method 400 and/or a portion thereof can allow for more accurate cardinality estimates, which can, in turn, allow for faster database query execution.

Although several aspects are described herein with respect to specific formulas, specific procedures, specific code, and/or the like other implementations are possible. For example, other procedures, which may utilize any number of programming languages, can be utilize to implement at least a portion of the described formulas, or some variation thereof.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such phrases are intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." The use of the term "based on," above and in the claims is intended to mean "based at least in part on," such that a feature or element that is not recited is also permissible.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   at least one processor; and
   at least one memory storing instructions which, when executed by the at least one processor, cause operations comprising:
      selecting, from a set of data on which a database query is to be executed, a subset of data, wherein the set of data includes a first quantity of tuples, and wherein the subset of data includes a second quantity of tuples;
      determining, based on evaluating one or more predicates on the subset, a third quantity of tuples in the subset that satisfy the one or more predicates; and
      determining, based on the first quantity, the second quantity, and the third quantity, a range within the subset, the range comprising estimated cardinalities of the one or more predicates within a predetermined error threshold range, wherein the determining the range further comprises:
         calculating, based on the first quantity, the second quantity, and the third quantity, a first estimate of a minimum quantity of tuples in the set of data that satisfy the one or more predicates; and
         calculating, based on the first quantity, the second quantity, and the third quantity, a second estimate of a maximum quantity of tuples in the set that satisfy the one or more predicates.

2. The system of claim 1, wherein the operations further comprise:
   calculating, within the range, one or more cardinality estimates for the one or more predicates; and
   generating, based on the one or more cardinality estimates, a query plan for execution of the database query.

3. The system of claim 1,
   wherein the minimum quantity of tuples is a representative sample of the set of data; and wherein the maximum quantity of tuples is the representative sample of the set of data.

4. The system of claim 1, wherein the calculating the first estimate of the minimum quantity comprises:
calculating a probability based on $$\frac{\binom{n-l}{m-k}\binom{l}{m}}{\binom{n}{m}},$$

wherein n represents the first quantity, wherein m represents the second quantity, wherein k represents the third quantity, and wherein l represents a variable; and
setting the minimum value to equal the variable when the probability is greater than or equal to a probability threshold.

5. The system of claim 1, wherein the first estimate of the minimum quantity and the second estimate of the maximum quantity are calculated based on a fixed-point calculation.

6. The system of claim 1, wherein the operations further comprise:
generating, based on the database query, one or more algebra representations comprising the set of data, wherein the database query comprises the one or more predicates.

7. The system of claim 1, wherein the subset is selected randomly from the set of data.

8. A method comprising:
selecting, from a set of data on which a database query is to be executed, a subset of data, wherein the set of data includes a first quantity of tuples, and wherein the subset of data includes a second quantity of tuples;
determining, based on evaluating one or more predicates on the subset, a third quantity of tuples in the subset that satisfy the one or more predicates; and
determining, based on the first quantity, the second quantity, and the third quantity, a range within the subset, the range comprising estimated cardinalities of the one or more predicates within a predetermined error threshold range, wherein the determining the range further comprises:
calculating, based on the first quantity, the second quantity, and the third quantity, a first estimate of a minimum quantity of tuples in the set of data that satisfy the one or more predicates; and
calculating, based on the first quantity, the second quantity, and the third quantity, a second estimate of a maximum quantity of tuples in the set that satisfy the one or more predicates.

9. The method of claim 8, further comprising:
calculating, within the range, one or more cardinality estimates for the one or more predicates; and
generating, based on the one or more cardinality estimates, a query plan for execution of the database query.

10. The method of claim 8,
wherein the minimum quantity of tuples is a representative sample of the set of data; and
wherein the maximum quantity of tuples is the representative sample of the set of data.

11. The method of claim 8, wherein the calculating the first estimate of the minimum quantity comprises:
calculating a probability based on $$\frac{\binom{n-l}{m-k}\binom{l}{m}}{\binom{n}{m}},$$

wherein n represents the first quantity, wherein m represents the second quantity, wherein k represents the third quantity, and wherein l represents a variable; and
setting the minimum value to equal the variable when the probability is greater than or equal to a probability threshold.

12. The method of claim 8, wherein the first estimate of the minimum quantity and the second estimate of the maximum quantity are calculated based on a fixed-point calculation.

13. The method of claim 8, further comprising:
generating, based on the database query, one or more algebra representations comprising the set of data, wherein the database query comprises the one or more predicates.

14. A non-transitory computer-readable medium comprising instructions which, when executed by at least one processor, result in operations comprising:
selecting, from a set of data on which a database query is to be executed, a subset of data, wherein the set of data includes a first quantity of tuples, and wherein the subset of data includes a second quantity of tuples;
determining, based on evaluating one or more predicates on the subset, a third quantity of tuples in the subset that satisfy the one or more predicates; and
determining, based on the first quantity, the second quantity, and the third quantity, a range within the subset, the range comprising estimated cardinalities of the one or more predicates within a predetermined error threshold range, wherein the determining of the range further comprises:
calculating, based on the first quantity, the second quantity, and the third quantity, a first estimate of a minimum quantity of tuples in the set of data that satisfy the one or more predicates; and
calculating, based on the first quantity, the second quantity, and the third quantity, a second estimate of a maximum quantity of tuples in the set that satisfy the one or more predicates.

15. The non-transitory computer-readable medium of claim 14, wherein the operations further comprise:
calculating, within the range, one or more cardinality estimates for the one or more predicates; and
generating, based on the one or more cardinality estimates, a query plan for execution of the database query.

16. The non-transitory computer-readable medium of claim 14,
wherein the minimum quantity of tuples is a representative sample of the set of data; and
wherein the maximum quantity of tuples is the representative sample of the set of data.

17. The non-transitory computer-readable medium of claim 14, wherein the calculating the first estimate of the minimum quantity comprises:
  calculating a probability based on $$\frac{\binom{n-l}{m-k}\binom{l}{m}}{\binom{n}{m}},$$

wherein n represents the first quantity, wherein m represents the second quantity, wherein k represents the third quantity, and wherein l represents a variable; and
  setting the minimum value to equal the variable when the probability is greater than or equal to a probability threshold.

18. The non-transitory computer-readable medium of claim 14, wherein the first estimate of the minimum quantity and the second estimate of the maximum quantity are calculated based on a fixed-point calculation.

19. The non-transitory computer-readable medium of claim 14, wherein the operations further comprise:
  generating, based on the database query, one or more algebra representations comprising the set of data, wherein the database query comprises the one or more predicates.

* * * * *